US012743799B2

(12) United States Patent
Sommer et al.

(10) Patent No.: US 12,743,799 B2
(45) Date of Patent: Sep. 22, 2026

(54) ALIGNING SCANNED ENVIRONMENTS FOR MULTI-USER COMMUNICATION SESSIONS

(71) Applicant: APPLE INC., Cupertino, CA (US)

(72) Inventors: Bruno M. Sommer, Sunnyvale, CA (US); Alexandre Da Veiga, San Francisco, CA (US); Long H. Ngo, San Jose, CA (US); Sebastian P. Herscher, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 18/592,586

(22) Filed: Mar. 1, 2024

(65) Prior Publication Data

US 2024/0202944 A1 Jun. 20, 2024

Related U.S. Application Data

(63) Continuation of application No. PCT/US2022/041952, filed on Aug. 30, 2022.

(Continued)

(51) Int. Cl.
*G06T 7/33* (2017.01)
*G06T 7/73* (2017.01)
*G06T 19/20* (2011.01)

(52) U.S. Cl.
CPC ................ *G06T 7/337* (2017.01); *G06T 7/74* (2017.01); *G06T 19/20* (2013.01);
(Continued)

(58) Field of Classification Search
CPC ........... G06T 7/337; G06T 7/74; G06T 19/20; G06T 2207/10028; G06T 2219/2004; G06T 19/006; G06V 20/20
See application file for complete search history.

(56) References Cited

U.S. PATENT DOCUMENTS 9,955,318 B1 * 4/2018 Scheper ................ H04W 4/024
10,602,121 B2 3/2020 Courchesne et al.
(Continued)

FOREIGN PATENT DOCUMENTS

WO 2015161307 A1 10/2015
WO 2017031389 A1 2/2017
WO 2020072972 A1 4/2020

OTHER PUBLICATIONS

European Patent Office (ISA/EP), Invitation to Pay Additional Fees and Partial International Search, International Application No. PCT/US2022/041952, 11 pages, Jan. 2, 2023.
(Continued)

*Primary Examiner* — Grace Q Li
(74) *Attorney, Agent, or Firm* — Thompson Hine LLP

(57) ABSTRACT

Various implementations provide a method for determining position data of a first device relative to a three-dimensional (3D) representation during a communication session. For example, a 3D representation is determined by a first device to correspond to a current physical environment of the first device. Then a spatial relationship is determined between the 3D representation and the current physical environment. Then position data is determined to correspond to a position of the first device relative to the 3D representation and based on a location of the first device in the current physical environment and the spatial relationship between the 3D representation and the current physical environment. The position data is then provided during a communication session between the first device and a second device with a view of the 3D representation including a representation of a user of the first device presented to a user of the second device.

19 Claims, 9 Drawing Sheets

Related U.S. Application Data

(60) Provisional application No. 63/244,865, filed on Sep. 16, 2021.

(52) U.S. Cl.
CPC ............... *G06T 2207/10028* (2013.01); *G06T 2219/024* (2013.01); *G06T 2219/2004* (2013.01)

(56) References Cited

U.S. PATENT DOCUMENTS

| | | | | |
|---|---|---|---|---|
| 11,321,932 | B1 * | 5/2022 | Kiviranta | H04N 21/242 |
| 2016/0253844 | A1 * | 9/2016 | Petrovskaya | G06Q 50/01 345/633 |
| 2018/0136461 | A1 | 5/2018 | Fitzgerald et al. | |
| 2018/0371712 | A1 * | 12/2018 | Glatfelter | B64F 1/3055 |
| 2019/0188895 | A1 | 6/2019 | Miller, IV et al. | |
| 2020/0008024 | A1 * | 1/2020 | Hu | H04W 4/38 |
| 2020/0309557 | A1 * | 10/2020 | Efland | G06V 20/20 |
| 2020/0342673 | A1 | 10/2020 | Lohr et al. | |
| 2022/0058877 | A1 * | 2/2022 | Huang | G06T 19/006 |
| 2022/0084316 | A1 * | 3/2022 | Wang | G06V 10/443 |
| 2024/0181625 | A1 * | 6/2024 | Kumar | G06T 7/194 |
| 2024/0212294 | A1 * | 6/2024 | Potetsianakis | G06T 19/006 |

OTHER PUBLICATIONS

European Patent Office (ISA/EP), International Search Report and Written Opinion of the International Searching Authority, International Application No. PCT/US2022/041952, 18 pages, Feb. 24, 2023.

European Patent Office, Communication pursuant to Article 94(3) EPC issued in European Patent Application No. 22777110.2 dated May 6, 2026 (Five (5) pages).

* cited by examiner

ALIGNING SCANNED ENVIRONMENTS FOR MULTI-USER COMMUNICATION SESSIONS

CROSS-REFERENCE TO RELATED APPLICATIONS

This patent application is a continuation of International Application No. PCT/US2022/041952 (International Publication No. WO 2023/043607) filed on Aug. 30, 2022, which claims priority to U.S. Provisional Application No. 63/244,865 filed on Sep. 16, 2021, entitled "ALIGNING SCANNED ENVIRONMENTS FOR MULTI-USER COMMUNICATION SESSIONS," each of which is incorporated herein by this reference in its entirety.

TECHNICAL FIELD

The present disclosure generally relates to electronic devices that use sensors to provide views during communication sessions, including views that include representations of one or more of the users participating in the sessions.

BACKGROUND

Various techniques are used to represent the participants of communication sessions such as video conferences, interactive gaming sessions, and other interactive social experiences. For example, the participants may see realistic or unrealistic representations of the users (e.g., avatars) participating in the sessions. The user representations may be positioned based on and move according to spatial constraints and spatial relationships.

SUMMARY

Various implementations disclosed herein include devices, systems, and methods that provide a representation of at least a portion of a user (e.g., an avatar) within an extended reality (XR) experience during a communication session. The XR experience presents representations of multiple users during the communication session, where the positioning of each representation is based on spatial constraints and spatial relationships between a previously acquired scan of the environment with the current physical environment. Spatial constraints (also referred to herein as spatial truth) refers to a requirement in an XR experience that relative positioning between content elements and their relative movement over time be the same for all users participating in a multi-user communication session. Spatial constraints may provide a natural and desirable experience in which consistent spatial positioning and movement lead to expected characteristics. For example, an XR environment may include a first user, a second user, and a virtual television in which the first user is facing and viewing the virtual television. Spatial constraints may ensure that the first user appears to be facing the virtual television to the second user, rather than facing another direction.

Certain implementations herein provide a position of a first user relative to a three-dimensional (3D) representation (e.g., a 3D scan such as a previously-captured point cloud) of the first user's current physical environment based on aligning the 3D representation and the current physical environment and determining the first user's position within the current physical environment. Such position information may be provided to position an avatar of the first user within a view of the 3D representation provided to second user, for example, during a multi-user communication session in which the second user views the scanned environment with the avatar of the first user accurately positioned within it. For example, if the first user is positioned sitting behind the desk in the first user's current physical environment, the second user will see an avatar of the first user positioned in the same relative position behind a representation of the desk in their view of the 3D representation. Positioning the first user in the same relative position behind a representation of the desk is accomplished based on detecting that the first user is within a physical environment associated with a 3D representation and aligning the 3D representation with respect to the physical environment, e.g., so that the first user's current position within the physical environment can be used to identify a corresponding position of the first user with respect to the 3D representation.

In general, one innovative aspect of the subject matter described in this specification can be embodied in methods, at a first device including one or more processors, that include the actions of determining that a three-dimensional (3D) representation of an environment corresponds to a current physical environment of the first device, determining a spatial relationship between the 3D representation and the current physical environment, determining position data corresponding to a position of the first device relative to the 3D representation based on a location of the first device in the current physical environment and the spatial relationship between the 3D representation and the current physical environment, and providing the position data during a communication session between the first device and a second device, wherein a view of the 3D representation including a representation of a user of the first device positioned based on the position data that is presented to a user of the second device during the communication session.

These and other embodiments can each optionally include one or more of the following features.

In some aspects, determining the spatial relationship between the 3D representation and the current physical environment includes aligning features based on visual matching. In some aspects, the 3D representation includes a feature map that includes features associated with a physical environment, and the visual matching is based on matching the feature map associated with the 3D representation with features identified in the current physical environment. In some aspects, the 3D representation includes anchor points, each anchor point associated with a particular location within a physical environment, and the visual matching is based on the anchor points.

In some aspects, determining the spatial relationship between the 3D representation and the current physical environment is based on visual simultaneous localization and mapping (SLAM). In some aspects, determining the spatial relationship between the 3D representation and the current physical environment is based on matching a WiFi signature of the 3D representation and a WiFi signature of the first device in the current physical environment. In some aspects, determining the spatial relationship between the 3D representation and the current physical environment is based on a best fit analysis between the 3D representation and sensor data of the first device in the current physical environment. In some aspects, determining the spatial relationship between the 3D representation and the current physical environment is based on matching semantic data associated with objects in a physical environment represented by the 3D representation and objects in the current physical environment.

In some aspects, the first device and the second device are in different physical environments. In some aspects, a view of the communication session is presented in an extended reality (XR) experience. In some aspects, the first device or the second device is a head-mounted device (HMD).

In some aspects, the representation of at least a portion of the user of the first device is generated based on sensor data obtained during the communication session. In some aspects, the method further includes updating at least a portion of the view at the second device based on user input at the first device.

In some aspects, the 3D representation includes a point cloud representing at least a portion of a physical environment. In some aspects, the view of the 3D representation at the first device includes an indication of the view the 3D representation at the second device.

In general, one innovative aspect of the subject matter described in this specification can be embodied in methods, at a first device including one or more processors, that include the actions of obtaining a selection of a three-dimensional (3D) representation of an environment, determining whether the selected 3D representation of an environment corresponds to a current physical environment of the first device, and in accordance with a determination that the 3D representation of an environment corresponds to the current physical environment, determining a spatial relationship between the 3D representation and the current physical environment, and presenting a view of the current physical environment while forgoing a view of the 3D representation of the environment.

These and other embodiments can each optionally include one or more of the following features.

In some aspects, in accordance with a determination that the 3D representation of an environment does not correspond to the current physical environment, the method further includes obtaining an approximation of a spatial relationship between the 3D representation and the current physical environment.

In some aspects, obtaining an approximation of the spatial relationship between the 3D representation and the current physical environment includes determining a best-fit alignment between the 3D representation and the current physical environment. In some aspects, obtaining an approximation of the spatial relationship between the 3D representation and the current physical environment is based on user input.

In some aspects, the method further includes, in accordance with a determination that the 3D representation of an environment does not correspond to the current physical environment, presenting a view of the 3D representation based on the approximation of the spatial relationship between the 3D representation and presenting a view of the current physical environment. In some aspects, the view of the 3D representation is presented as overlaid on the view of the current physical environment.

In some aspects, the method further includes determining position data corresponding to a position of the first device relative to the 3D representation based on a location of the first device in the current physical environment and the spatial relationship between the 3D representation and the current physical environment or the approximation of the spatial relationship between the 3D representation and the current physical environment, and providing the position data during a communication session between the first device and a second device, wherein a view of the communication session including a representation of a user of the first device positioned based on the position data is presented to a user of the second device during the communication session.

In some aspects, the representation of at least a portion of the user of the first device is generated based on sensor data obtained during the communication session. In some aspects, the method further includes updating at least a portion of the view of the communication session at the second device based on user input at the first device. In some aspects, the view of the 3D representation or the view of the current physical environment at the first device includes an indication of the view the 3D representation at the second device.

In some aspects, determining the spatial relationship between the 3D representation and the current physical environment includes aligning features based on visual matching. In some aspects, the 3D representation includes a feature map that includes features associated with a physical environment, and the visual matching is based on matching the feature map associated with the 3D representation with features identified in the current physical environment. In some aspects, the 3D representation includes anchor points, each anchor point associated with a particular location within a physical environment, and the visual matching is based on the anchor points.

In some aspects, determining the spatial relationship between the 3D representation and the current physical environment is based on visual simultaneous localization and mapping (SLAM). In some aspects, determining the spatial relationship between the 3D representation and the current physical environment is based on matching a WiFi signature of the 3D representation and a WiFi signature of the first device in the current physical environment. In some aspects, determining the spatial relationship between the 3D representation and the current physical environment is based on a best fit analysis between the 3D representation and sensor data of the first device in the current physical environment. In some aspects, determining the spatial relationship between the 3D representation and the current physical environment is based on matching semantic data associated with objects in a physical environment represented by the 3D representation and objects in the current physical environment.

In some aspects, the first device and the second device are in different physical environments. In some aspects, a view of the communication session is presented in an extended reality (XR) experience. In some aspects, the first device or the second device is a head-mounted device (HMD).

In some aspects, the representation of at least a portion of the user of the first device is generated based on sensor data obtained during the communication session. In some aspects, the method further includes updating at least a portion of the view at the second device based on user input at the first device.

In some aspects, the 3D representation includes a point cloud representing at least a portion of a physical environment. In some aspects, the view of the 3D representation at the first device includes an indication of the view of the 3D representation at the second device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
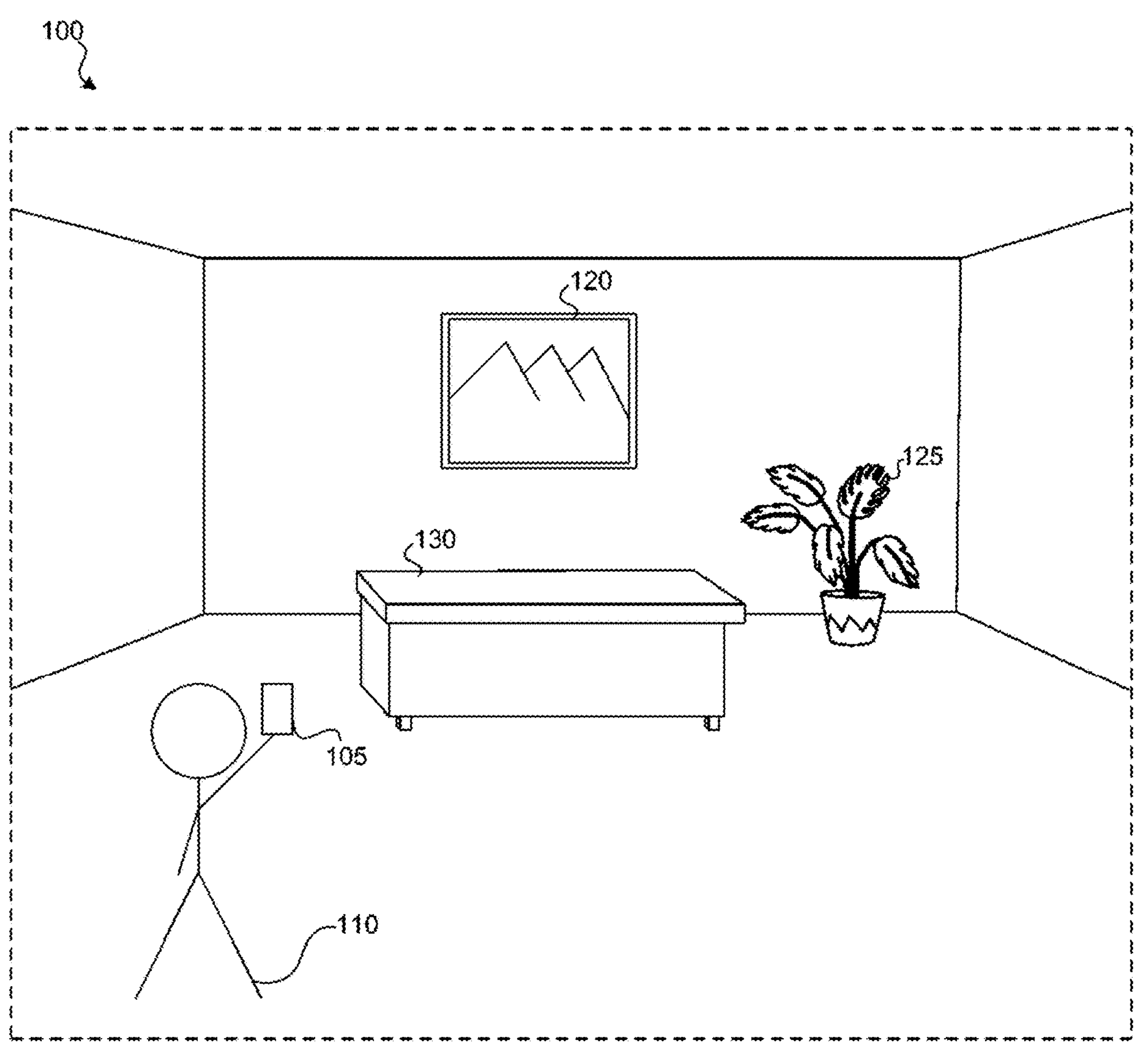
FIG. 1 is an example of a device used within a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 105 operating in a physical environment 100 in accordance with some implementations. In this example, the exemplary physical environment 100 includes physical objects such as wall hanging 120, plant 125, and desk 130. Additionally, physical environment 100 includes user 110 holding device 105. In some implementations, the device 105 is configured to present an extended reality (XR) environment to the user 110. The presented environment can include extended reality features.

In some implementations, the device 105 is a handheld electronic device (e.g., a smartphone or a tablet). In some implementations, the device 105 is a near-eye device such as a head worn device. The device 105 utilizes one or more display elements to present views. For example, the device 105 may enclose the field-of-view of the user 110. In some implementations, the functionalities of device 105 are provided by more than one device. In some implementations, the device 105 communicates with a separate controller or server to manage and coordinate an experience for the user. Such a controller or server may be located in or may be remote relative to the physical environment 100.

In particular, FIG. 1 illustrates user 110 performing a scan of the physical environment 100. For example, user 110 is acquiring sensor data (e.g., image data, depth data, or the like) of the environment 100 (e.g., an office area) via electronic device 105. The acquired sensor data can provide a three-dimensional (3D) representation that corresponds to the environment of device 105 at that time. The 3D representation may be a 3D point cloud generated during a scanning procedure. In some implementations, post processing of the sensor data for the 3D representation may generate a feature map and/or anchor points that may be identified to facilitate subsequent alignment. An example feature map of physical environment 100 is illustrated in FIG. 2, and example identified anchor points of physical environment 100 is illustrated in FIG. 3.

Figure 2:
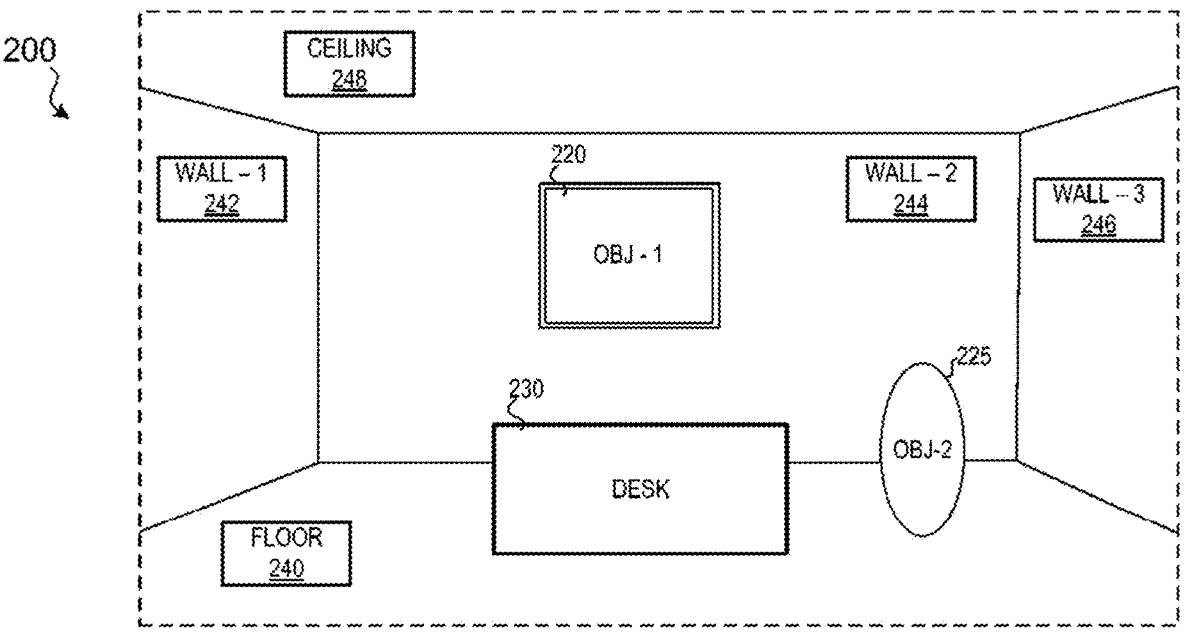
FIG. 2 illustrates an example feature map based on sensor data of the physical environment from the device of FIG. 1.

FIG. 2 illustrates an example feature map 200 based on sensor data of the physical environment 100 from the device of FIG. 1. In particular, after the device 105 acquired sensor data of the physical environment 100 (e.g., user 110 walks around the office space to scan his or her office), feature map 200 may be generated based on one more image analysis techniques. For example, based on acquired image data and an object detection algorithm, one or more objects or attributes in the physical environment 100 may be identified for a feature map extraction. In particular, as illustrated in FIG. 2, multiple different objects, room features/attributes, and the like can be identified. For example, if the user 110 scans the area around the desk 130 in FIG. 1, the following objects may be identified: OBJ-1 220 (e.g., wall hanging 120), OBJ-2 225 (e.g., plant 125), and DESK 230 (e.g., desk 130). Additionally, if the user 110 scans the area around the desk 130 in FIG. 2, the following features or room attributes may be identified: floor 240, wall-1 242 (e.g., the wall to the left of desk 130), wall-2 244 (e.g., the wall directly behind desk 130), wall-3 246 (e.g., the wall to the right desk 130), and ceiling 248. In some implementations, detecting the objects, room attributes, and the like, of the physical environment 100 may be based on an object detection technique using machine learning (e.g., a neural network, decision tree, support vector machine, Bayesian network, or the like).

Figure 3:
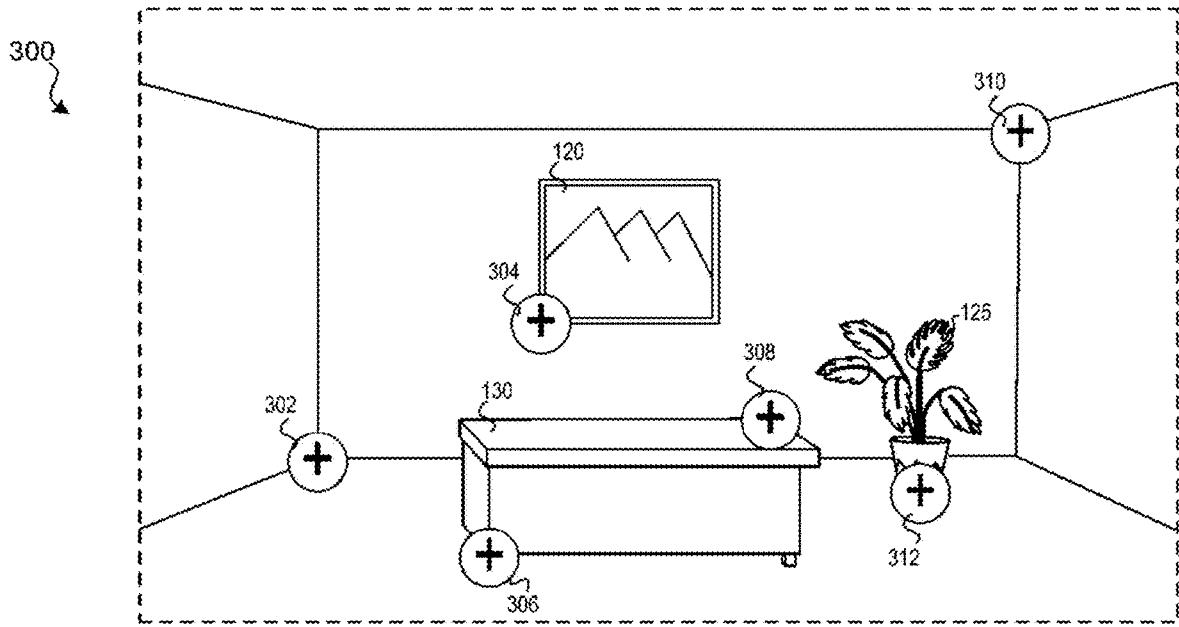
FIG. 3 illustrates example anchor points based on sensor data of the physical environment from the device of FIG. 1.

FIG. 3 illustrates example anchor points in the anchor point representation 300 based on sensor data of the physical environment from the device of FIG. 1. In particular, after the device 105 acquired sensor data of the physical environment 100 (e.g., user 110 walks around the office space to scan his or her office), anchor point representation 300 may be generated based on one more image analysis techniques. For example, based on acquired image data and an anchor point detection algorithm, one or more objects or attributes in the physical environment 100 may be identified for anchor point selection. In particular, as illustrated in FIG. 3, multiple different objects, room features/attributes, and the like can be identified for anchor point selection. For example, if the user 110 scans the area around the desk 130 in FIG. 1, the following (but not limited to) anchor points may be identified: anchor point 302 (e.g., a bottom corner of the room adjacent to the floor), anchor point 304 (e.g., a bottom corner of the wall hanging 120), anchor point 306 (e.g., a bottom leg/corner of the desk 130), anchor point 308 (e.g., a top surface corner of the desk 130), anchor point 310 (e.g., a top corner of the room adjacent to the ceiling), and anchor point 312 (e.g., a bottom edge of the plant 125 adjacent to the floor). In some implementations, detecting the anchor points of the physical environment 100 may be based on an anchor point detection technique using machine learning (e.g., a neural network, decision tree, support vector machine, Bayesian network, or the like).

Figure 4:
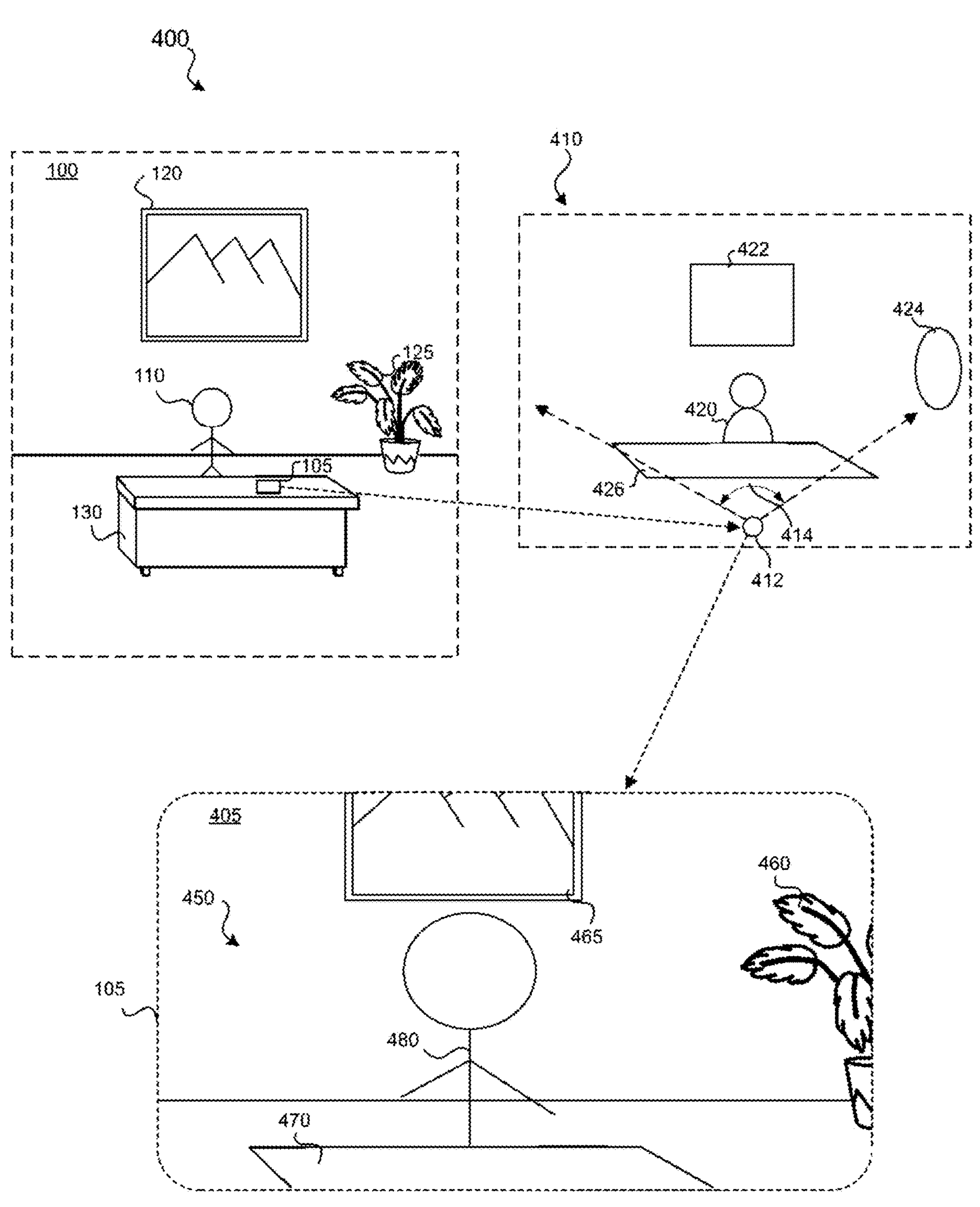
FIG. 4 is an example of a device used within a physical environment and an example view from the device based on a feature map in accordance with some implementations.

FIG. 4 is an example of an operating environment 400 of a device 105 used within physical environment 100 and an example view 405 from the device 105 based on a feature map 410 in accordance with some implementations. In particular, operating environment 400 illustrates the user 110 sitting behind desk 130 in the physical environment 100 of FIG. 1 (e.g., after the user 110 has performed a 3D representation of the physical environment 100). The user 110, in the operating environment 400, has placed device 105 at the far edge of desk 130 in order to start an alignment process (e.g., aligning the current physical environment at the current time of the user behind desk 130 with the scanned environment of physical environment 100 from FIG. 1). For example, operating environment 400 illustrates the process of creating a feature map 410 of the current physical environment to be used to compare to the obtained feature map (e.g., feature map 200 of FIG. 2).

Feature map 410 illustrates an example viewpoint 414 from the perspective of the electronic device 105 as depicted by location indicator 412. Feature map 410 includes location/position information as indicated by object 422 (e.g., wall hanging 120), object 424 (e.g., plant 125), object 426 (e.g., desk 130). Additionally, feature map 410 identifies the location of user 110, as illustrated by representation 420. Thus, as shown in view 405 of 3D environment 450, a user of device 105 may see a view of 3D environment 450 from the perspective of the device 105 (e.g., from the perspective of location indicator 412 such as a forward facing camera, or an XR environment that represents a forward facing camera view of device 105). For example, view 405 illustrates 3D environment 450 that includes representation 460 of plant 125, representation 465 of wall hanging 120, representation 470 of desk 130, and representation 480 of the user 110. Representations 460, 465, 470, may be images (e.g., video) of the actual objects, may be views of each physical object as seen through a transparent or translucent display, may be virtual content that represents each physical object, or representations 460, 465, 470 may be a combination of virtual content and images and/or pass through video (e.g., an XR experience). Similarly, representation 480 of the user 110 may be an actual video of the user 110, may be generated virtual content that represents the user 110 (e.g., an avatar), or may be a view of the user 110 as seen through a transparent or translucent display.

Figure 5:
FIG. 5 illustrates exemplary electronic devices operating in different physical environments during a communication session in accordance with some implementations.
Figure 5:
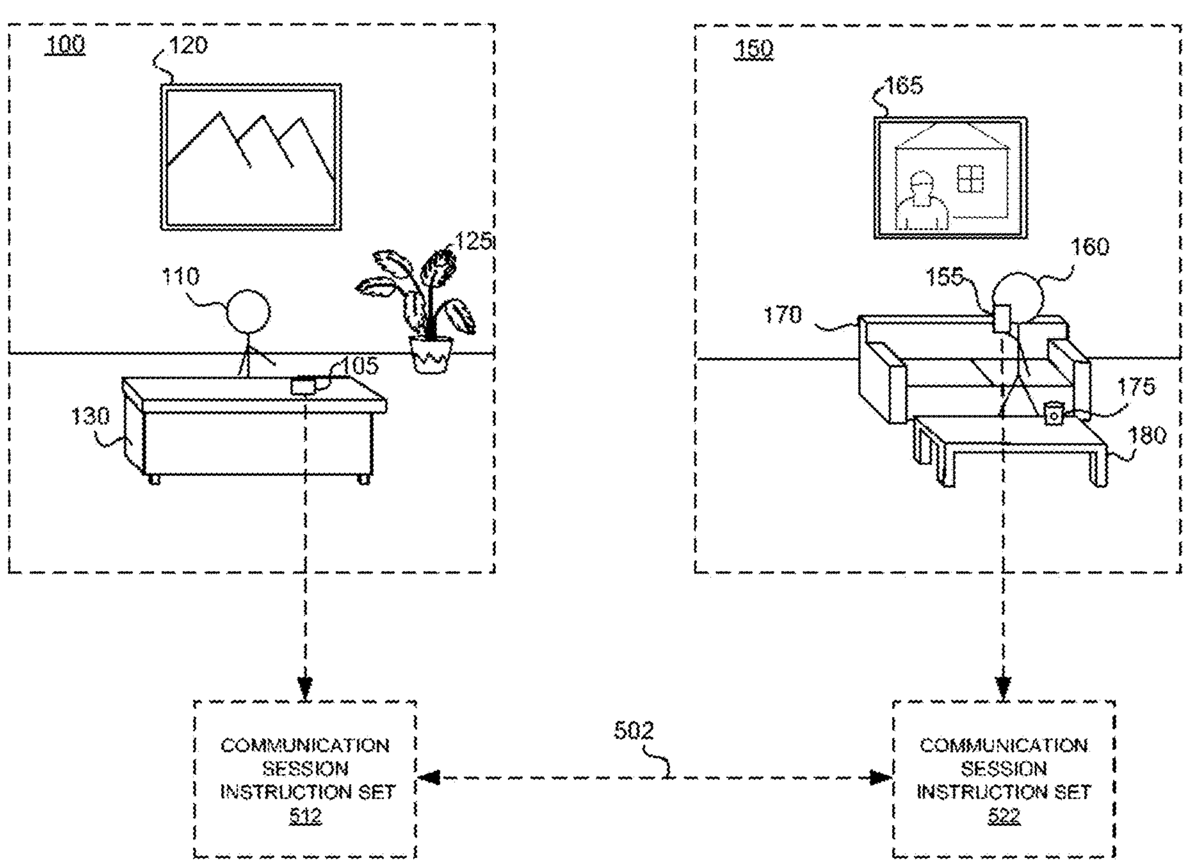

FIG. 5 illustrates exemplary operating environment 500 of electronic devices 105, 155 operating in different physical environments 100, 150, respectively, during a communication session, e.g., while the electronic devices 105, 155 are sharing information with one another or an intermediary device such as a communication session server. In this example of FIG. 5, the physical environment 100 is a room that includes a wall hanging 120, a plant 125, and a desk 130. The electronic device 105 includes one or more cameras, microphones, depth sensors, or other sensors that can be used to capture information about and evaluate the physical environment 100 and the objects within it, as well as information about the user 110 of the electronic device 105. The information about the physical environment 100 and/or user 110 may be used to provide visual and audio content during the communication session. For example, a communication session may provide views to one or more participants (e.g., users 110, 160) of a 3D environment that is generated based on camera images and/or depth camera images of the physical environment 100 as well as a representation of user 110 based on camera images and/or depth camera images of the user 110.

In this example, the physical environment 150 is a room that includes a wall hanging 165, a sofa 170, and a coffee cup 175 on a coffee table 180. The electronic device 155 includes one or more cameras, microphones, depth sensors, or other sensors that can be used to capture information about and evaluate the physical environment 150 and the objects within it, as well as information about the user 160 of the electronic device 155. The information about the physical environment 150 and/or user 160 may be used to provide visual and audio content during the communication session. For example, a communication session may provide views of a 3D environment that is generated based on camera images and/or depth camera images (from electronic device 105) of the physical environment 100 as well as a representation of user 160 based on camera images and/or depth camera images (from electronic device 155) of the user 160. For example, a 3D environment may be sent by the device 105 by a communication session instruction set 512 in communication with the device 155 by a communication session instruction set 522 (e.g., via network connection 502). However, it should be noted that representations of the users 110, 160 may be provided in other 3D environments. For example, a communication session may involve representations of either or both users 110, 160 that are positioned within any entirely virtual environment or an extended reality (XR) environment that includes some physical environment representations and some virtual environment representations. Such views are illustrated in the examples of FIGS. 6-8 described next.

Figure 6:
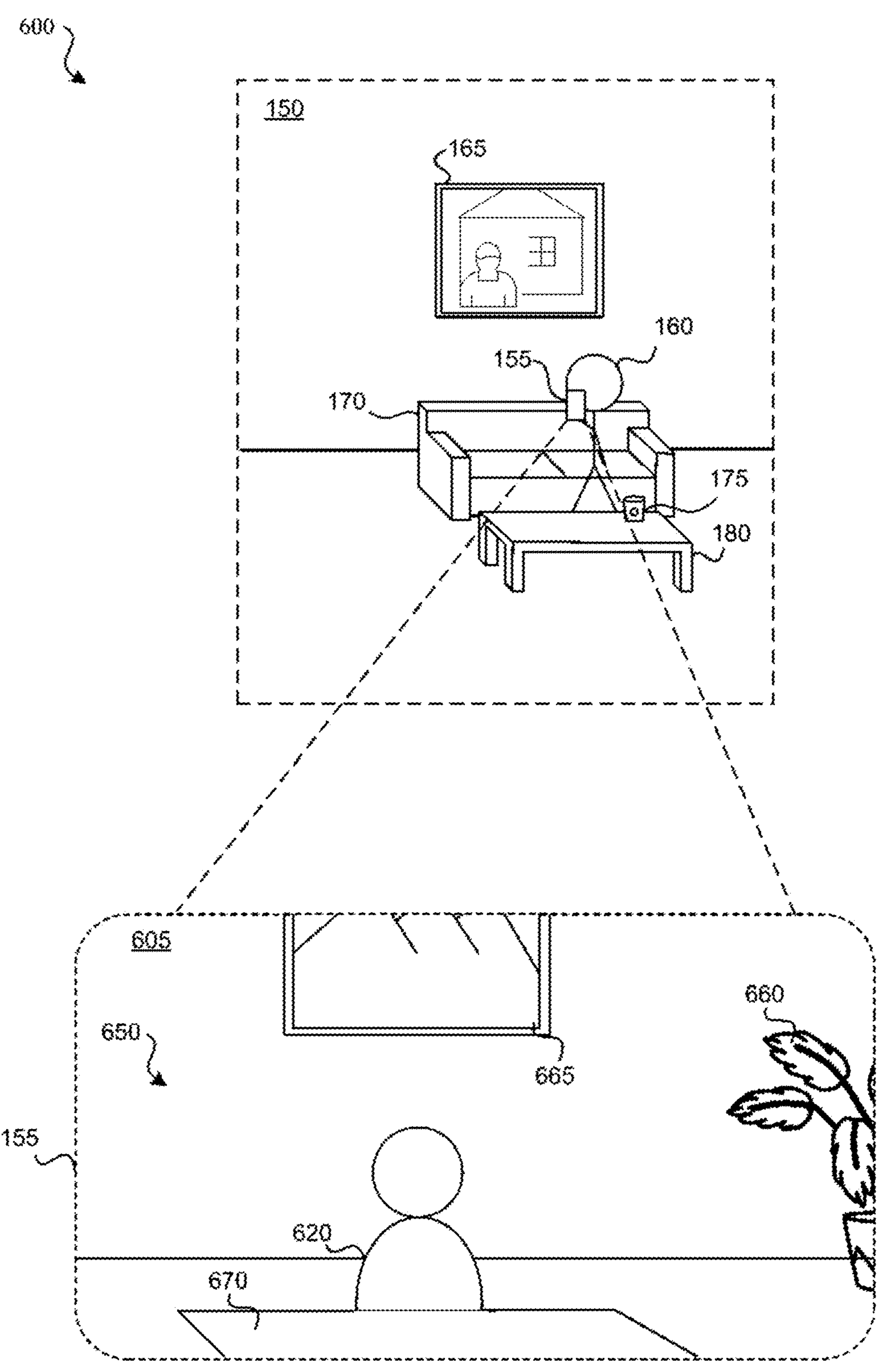
FIG. 6 illustrates an exemplary view of an electronic device of FIG. 5 during a communication session, where the view is of an extended reality (XR) environment that is different than the physical environment of the device.
Figures 7, 8:
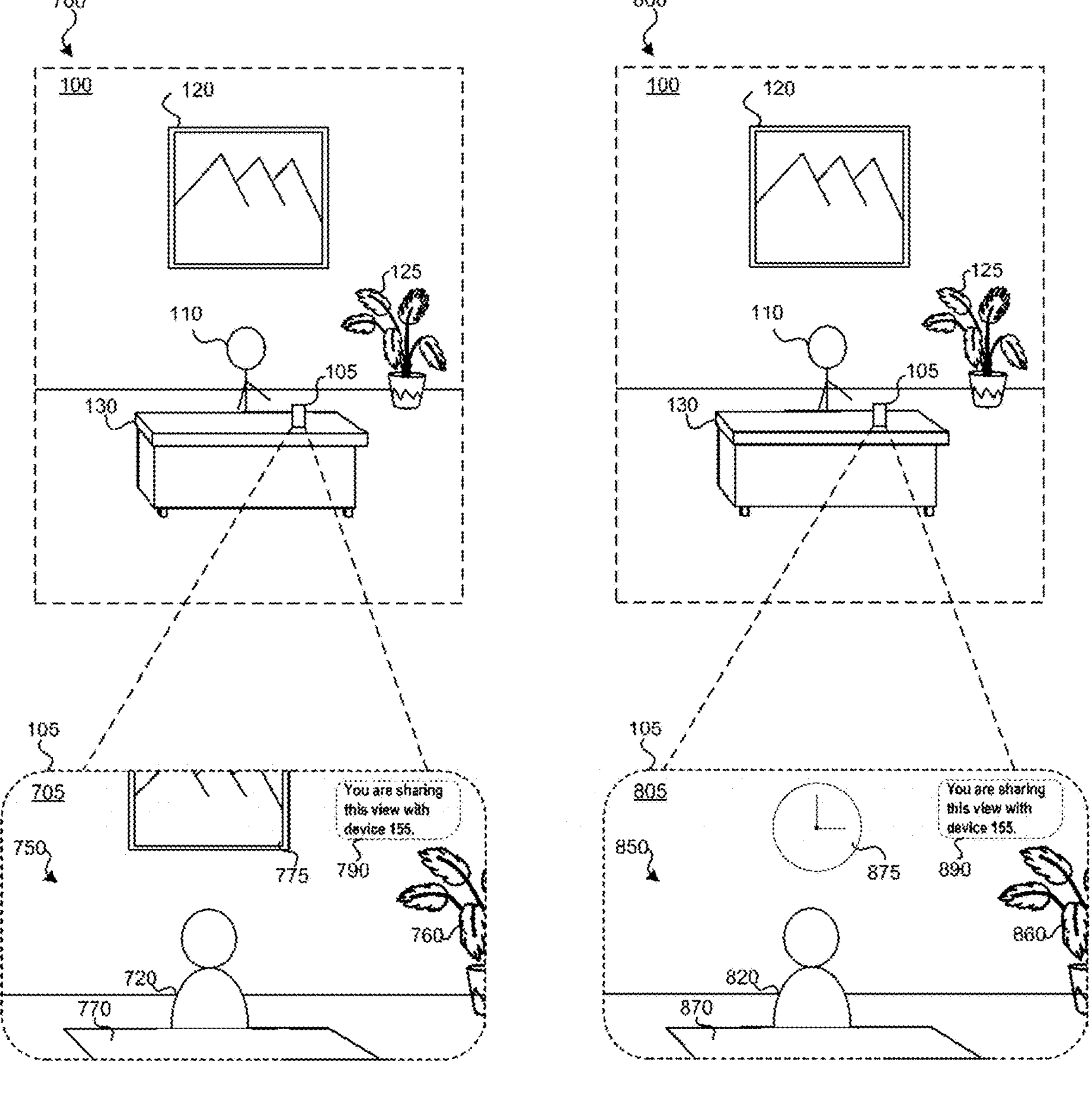
FIG. 7 illustrates an exemplary view of an electronic device of FIG. 5 during a communication session, where the view is of an XR environment that is a representation of the physical environment of the device.
FIG. 8 illustrates an exemplary view of an electronic device of FIG. 5 during a communication session, where the view is of an XR environment that is a representation of the physical environment of the device.

FIG. 6 illustrates exemplary operating environment 600 of the exemplary electronic device 155 of FIG. 5 providing a view 605 during a communication session with electronic device 105. In this example, during the communication session, the electronic device 155 provides a view 605 that enables user 160 to view a representation 620 of at least a portion of the user 110 within the obtained 3D environment 650 (e.g., an XR environment) from the communication session. For example, the user 160 views the representation of the user 110 and the physical environment of user 110 (e.g., the office of user 110). Additionally, the view 605 includes representation 660 of plant 125, representation 665 of wall hanging 120, and representation 670 of desk 130. In some implementations, the representation 620 of the user 110 may provide a live, real-time view of the user 110, e.g., based on sensor data including images and other sensor data of the user 110 obtained during the communication session. As the user 110 moves around, makes hand gestures, and makes facial expressions, corresponding movements, gestures, and expressions may be displayed for the representation 620 in the view 605. For example, as the user 110 moves left two feet in physical environment 100, the view 605 may show the representation 620 (e.g., an avatar) moving left two feet in the view 605 corresponding to the user 110 movement.

The 3D environment 650 illustrates a position of user 110 relative to a 3D representation (e.g., a previously-captured point cloud as described herein with reference to FIG. 1) of the user's 110 current physical environment 100 based on aligning the 3D representation and the current physical environment 100 (e.g., sitting behind the desk as illustrated in FIG. 4) and determining the user's 110 position within the current physical environment 100. For example, determining where the user 110 is positioned in his or her office at the current moment. Such position information may be provided to position an avatar 620 of the user 110 within view 605 of the 3D representation (e.g., 3D environment 650) provided to second user 160, for example, during a multi-user communication session in which the second user 160 views the scanned environment with the avatar 620 of the first user 110 accurately positioned within it. For example, if the first user 110 is positioned behind the desk 130 in the first user's current physical environment 100, the second user will see an avatar (e.g., representation 620) of the first user 110 positioned in the same relative position behind a representation 670 of the desk 130 in view 605 of the 3D representation (e.g., 3D environment 650). This is accomplished based on detecting that the first user 110 is within an environment associated with a 3D representation (e.g., the user is in physical environment 100, the user's office space), and aligning the 3D representation with respect to the physical environment. Thus, the first user's 110 current position within the environment 100 can be used to identify a corresponding position of the representation 620 of the user 110 with respect to the 3D representation (e.g., 3D environment 650).

In some implementations, the 3D environment 650 is an XR environment that is based on a common coordinate system that can be shared with other users (e.g., a virtual room for avatars for a multi-person communication session). In other words, the common coordinate system of the 3D environment 650 is different than the coordinate system of the physical environment 100 for user 110 and the physical environment 150 for user 160. For example, a common reference point may be used to align the coordinate systems. In some implementations, the common reference point may be a virtual object within the 3D environment 650 that each user can visualize within their respective views. For example, a common center piece table that the user representations (e.g., the user's avatars) are positioned around within the 3D environment 650. Alternatively, the common reference point is not visible within each view (e.g., view 605). For example, a common coordinate system of the 3D environment 650 uses a common reference point (e.g., representation 670) for positioning each respective user representation (e.g., around a table/desk). Thus, if the common reference point is visible, then each view of the device (e.g., view 605) would be able to visualize the "center" of the 3D environment 650 for perspective when viewing other user representations. The visualization of the common reference point may become more relevant with a multi-user communication session such that each user's view can add perspective to the location of each other user during the communication session.

In some implementations, the representation 620 of user 110 may be realistic or unrealistic and/or may represent a current and/or prior appearance of the user 110. For example, a photorealistic representation of the user 110 may be generated based on a combination of live images and prior images of the user. The prior images may be used to generate portions of the representation 620 for which live image data is not available (e.g., portions of a user's face that are not in view of a camera or sensor of the electronic device 105 or that may be obscured, for example, by a headset or otherwise). In one example, the electronic device 105 is a head mounted device (HMD) and live image data of the user's face includes a downward facing camera images of the user's checks and mouth and inward facing camera images of the user's eyes, which may be combined with prior image data of the user's other portions of the users face, head, and torso that cannot be currently observed from the sensors of the device 105. Prior data regarding a user's appearance may be obtained at an earlier time during the communication session, during a prior use of the electronic device, during an enrollment process used to obtain sensor data of the user's appearance from multiple perspectives and/or conditions, or otherwise.

Some implementations provide a representation of at least a portion of a user within a 3D environment other than the user's physical environment during a communication session and, based on detecting a condition, provide a representation of another object of the user's physical environment to provide context. For example, during a communication session, representations of one or more other objects of the physical environment 150 may be displayed in the view 605. For example, based on determining that the user 160 is interacting with a physical object in physical environment 150, a representation (e.g., realistic or proxy) may be displayed in view 605 to provide context for the interaction of the user 160. For example, if the second user 160 picks up an object, such as a family picture frame, to show to the first user 110, the view 605 at device 155, may include a realistic view of the picture frame (e.g., live video). Thus, while displaying an XR environment, the view 605 may present a virtual object that represents the user picking up a generic object, display a virtual object that is similar to a picture frame, display previous acquired image(s) of the actual picture frame from the obtained 3D representation, allow a view of the user picking up the object through a transparent or translucent display, or the like.

FIG. 7 illustrates an exemplary operating environment 700 of an exemplary view 705 of an electronic device 105 of FIG. 5 during a communication session with user 160 using device 155, where the view 705 is of a 3D environment 750 that is a representation of the physical environment 100 of the device 105. In particular, operating environment 700 illustrates a preview mode/preview screen for a communication session so that the presenter (user 110) can view what the other user (e.g., user 160) is being presented either during the communication session, or prior to allowing the other user to view user's 110 3D environment 750. In this example, during the communication session, the electronic device 105 provides a view 705 that enables user 110 to view a representation 720 of at least a portion of himself or herself within the 3D environment 750 (e.g., an XR environment) from the communication session (e.g., the user 110 sees himself or herself in a preview mode). For example, the user 110 views the representation of himself or herself and a representation of the physical environment 100 of user 110 (e.g., the office of user 110). The view 705 includes representation 760 of plant 125, representation 775 of wall hanging 120, and representation 770 of desk 130. Additionally, the view 705 includes a notification bubble 790 that provides an indication to the user 110 of what view of the 3D environment is being shared with, or will be shared with, user 160 at device 155 for a communication session. For example, notification bubble 790 provides user 110 with the indication text: "You are sharing this view with device 155," during a live communication session. Alternatively, if the scenario was before the communication session begins, the notification bubble 790 may provide user 110 with indication text, e.g., "You will be sharing this view with device 155, do you wish to proceed?"

FIG. 8 illustrates an exemplary operating environment 800 of an exemplary view 805 of an electronic device 105 of FIG. 5 during a communication session with user 160 using device 155, where the view 805 is of a 3D environment 850 that is a representation of the physical environment 100 of the device 105. In particular, operating environment 800 illustrates a preview mode/preview screen for a communication session so that the presenter (user 110) can view what the other user (e.g., user 160) is being presented either during the communication session, or prior to allowing the other user to view user's 110 3D environment 850 using alternate virtual content (e.g., virtual content 875—a virtual clock) that may be selected by the user. In this example, during the communication session, the electronic device 105 provides a view 805 that enables user 110 to view a representation 820 of at least a portion of himself or herself within the 3D environment 850 (e.g., an XR environment) from the communication session (e.g., the user 110 sees himself or herself in a preview mode). For example, the user 110 views the representation of himself or herself and a representation of the physical environment 100 of user 110 (e.g., the office of user 110). The view 805 also includes representation 860 of plant 125 and representation 870 of desk 130.

In some implementations, as illustrated in FIG. 8, the user 110 can add virtual objects to the XR environment being shared to user 160 at device 155. Additionally, or alternatively, in some implementations, a privacy option may enable the user 110 to limit or otherwise select portions of the 3D representation to be shared. For example, as illustrated in FIG. 8, the user 110 removed a representation (e.g., representation 775 of FIG. 7) of the wall hanging 120 (e.g., for privacy reasons, or just because the user wanted to make their office more appealing), and added virtual content 875 (e.g., a virtual clock). The virtual content 875 may replace objects in the 3D environment 850, which is shared with device 155, or additional virtual content may be added to other locations (e.g., adding a virtual object, such as a virtual desk ornament on top of the representation 870 of the desk 130).

In some implementations, a visual treatment, such as highlighting, adding or removing color, displaying a boundary, or the like, may be applied to the view 705/805 to indicate portions of the 3D environment that is or will be shared with another user. This visual treatment may be applied during the preview mode, the communication session, or both.

In some implementations, the view 705/805 may be generated using visual elements from the 3D representation of environment 100. For example, a point cloud representation of environment 100 may be displayed within view 705/805 during the preview mode, the communication session, or both. In other implementations, the view 705/805 may not be generated using visual elements from the 3D representation of environment 100 when it is determined that the 3D representation corresponds (e.g., represents) the environment in which the user 110 is located. In these implementations, device 105 may instead present pass-through video of the environment 100 or may allow the user to directly view environment 100 through a transparent or translucent display. In doing so, user 110 may advantageously be presented with a higher quality view of environment 100 than can be obtained using the 3D representation. For example, point clouds are often sparse representations of a 3D object or environment and contain visible holes or gaps.

In the examples of FIGS. 1-8, the electronic devices 105, 155 are illustrated as hand-held devices. The electronic devices 105, 155 may be a mobile phone, a tablet, a laptop, so forth. In some implementations, electronic devices 105, 155 may be worn by a user. For example, electronic devices 105, 155 may be a watch, a head-mounted device (HMD), head-worn device (glasses), headphones, an car mounted device, and so forth. In some implementations, functions of the devices 105, 155 are accomplished via two or more devices, for example a mobile device and base station or a head mounted device and an ear mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 105, 155 may communicate with one another via wired or wireless communications.

Figure 9:
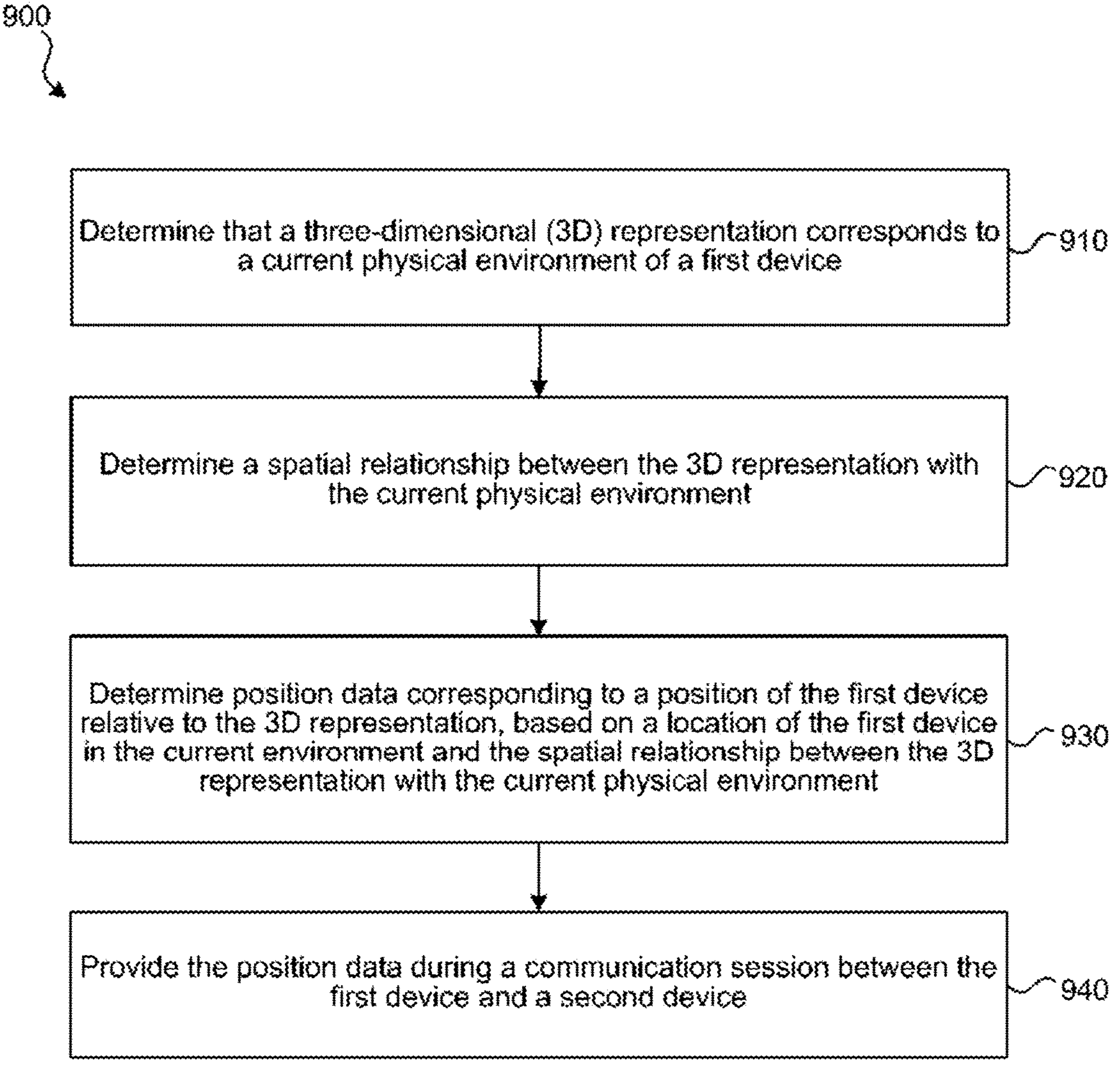
FIG. 9 is a flowchart illustrating a method for determining position data corresponding to a position of a first device relative to a three-dimensional (3D) representation during a communication session between the first device and a second device in accordance with some implementations.

FIG. 9 is a flowchart illustrating a method 900 for determining position data corresponding to a position of a first device relative to a 3D representation during a communication session between the first device and a second device. In some implementations, a device, such as electronic device 105 or electronic device 155, or a combination of the two, performs method 900. In some implementations, method 900 is performed on a mobile device, desktop, laptop, HMD, car-mounted device or server device. The method 900 is performed by processing logic, including hardware, firmware, software, or a combination thereof. In some implementations, the method 900 is performed on a processor executing code stored in a non-transitory computer-readable medium (e.g., a memory).

At block 910, the method 900 determines whether a 3D representation corresponds to a current physical environment of the first device. The 3D representation (e.g., a 3D scan) may be a point cloud generated during a previously performed scanning procedure. In some implementations, the 3D representation includes a point cloud representing at least a portion of the current physical environment. For example, device 105 scans the physical environment 100 of FIG. 1.

In some implementations, when the 3D representation is generated, a feature map and/or anchor points may be identified to facilitate subsequent alignment. For example, device 105 scans the physical environment 100 of FIG. 1 and generates the feature map 200 of FIG. 2. Additionally, or alternatively, device 105 scans the physical environment 100 of FIG. 1 and generates anchor points as illustrated in the anchor point representation 300 of FIG. 3. For example, during a scanning procedure, device 105 may currently perform a visual simultaneous localization and mapping (SLAM) process while generating a 3D point cloud representation of a physical environment. The 3D point cloud may have a positional and/or rotational offset relative to the SLAM map generated during the scanning procedure. In these examples, block 910 may include performing a SLAM process on the current physical environment and comparing the SLAM map generated during the scanning procedure with the SLAM map of the current physical environment. It may be determined that the 3D representation corresponds to the current physical environment when the two SLAM maps are within a threshold similarity of one another. It may be determined that the 3D representation does not correspond to the current physical environment when the two SLAM maps are not within the threshold similarity of one another In other implementations, the 3D representation may be associated with other types of location data, such as GPS, WiFi, beacons, cellular signals, or the like. In these examples, block 910 may include comparing the location data associated with the 3D representation with corresponding location data obtained at the current physical environment.

At block 920, the method 900 includes determining a spatial relationship between the 3D representation and the current physical environment. For example, determining a spatial relationship may involve aligning based on visual matching, such as based on comparing images and/or features identified based on images. Additionally, or alternatively, determining a spatial relationship may involve visual matching based on anchor points. In some implementations, the aligning may involve matching a feature map associated with the 3D representation with features identified in the current physical environment, WIFI-matching, detecting planes, a best fit analysis, using semantic data identifying floors and walls, high-level 2D matching, and the like.

In some implementations, determining the spatial relationship between the 3D representation and the current physical environment includes aligning features based on visual matching. For example, based on comparing images and/or features identified based on images, as illustrated by the feature map 200 of FIG. 2 and/or the feature map 410 of FIG. 4. In some implementations, the 3D representation includes a feature map (e.g., feature map 200 of FIG. 2) that includes features associated with the current physical environment, and the visual matching is based on matching the feature map associated with the 3D representation with features identified in the current physical environment. For example, as illustrated and discussed herein regarding the feature map 410 of FIG. 4, the feature map matching processes identify particular features in a current scan of the environment (e.g., the user sitting down at their desk in preparation for a communication session). In some implementations, the 3D representation includes anchor points (e.g., anchor point representation 300 of FIG. 3), where each anchor point is associated with a particular location within the current physical environment, and the visual matching is based on the anchor points. For example, as discussed herein with reference to the feature map 410 of FIG. 4, the anchor points of FIG. 3 may be used in addition to or alternatively to the feature map 410. An anchor point matching process may identify particular anchors in a current scan of the environment (e.g., the user sitting down at their desk in preparation for a communication session), and based on the identified anchors in the current scan, match those with the acquired 3D representation (e.g. based on location data, orientation, visual features, a corner, a portion of an object that is typically stationary, and the like).

In some implementations, determining the spatial relationship between the 3D representation and the current physical environment is based on visual simultaneous localization and mapping (SLAM). Alternatively, or additionally, in some implementations, determining the spatial relationship between the 3D representation and the current physical environment is based on matching a WiFi signature of the 3D representation and a WiFi signature of the first device in the current physical environment. WiFi matching geolocates an electronic device based on a distance from the device to known WiFi signals. For instance, if a scan is associated to nearby WiFi signals (and their relative strength when the capture was made), the system can later attempt to relocalize the device (e.g., a coarse relocalization) based on the current WiFi signature sensed by the system.

In some implementations, determining the spatial relationship between the 3D representation and the current physical environment is based on a best fit analysis between the 3D representation and sensor data of the first device in the current physical environment. In some implementations, determining the spatial relationship between the 3D representation and the current physical environment is based on matching semantic data associated with objects in the current physical environment between the 3D representation and sensor data of the first device in the current physical environment. For example, semantic data may be used to identify floors and walls, and using high-level 2D matching may be used to determine the spatial relationship between the 3D representation and the current physical environment.

In some implementations, as mentioned above, the 3D representation (e.g., 3D point cloud) may be aligned with a SLAM map generated during a scanning procedure. In these implementations, block 920 may include aligning the SLAM map generated during the scanning procedure with a SLAM map of the current physical environment and determining the spatial relationship between the 3D representation and the current physical environment based on the known positional and/or rotational offset between the 3D representation and the SLAM map generated during the scanning procedure. Performing alignment in this way advantageously allows for alignment between a 3D representation (e.g., 3D point cloud) and a SLAM map, which may be difficult to do otherwise.

At block 930, the method 900 determines position data corresponding to a position of the first device relative to the 3D representation, based on a location of the first device in the current physical environment and the spatial relationship between the 3D representation and the current physical environment. In some implementations, the position data may include a location, an orientation, or a combination of the two (e.g., a pose).

At block 940, the method 900 provides the position data during a communication session between the first device and a second device. In some implementations, a view of the 3D representation including a representation of a user of the first device positioned based on the position data is presented to a user of the second device during the communication session. In some implementations, the representation of the first user may be based on live sensor data obtained during the communication session (e.g., a real-time avatar). Additionally, a privacy option may enable the first user to limit or otherwise select portions of the 3D representation to be shared. In some implementations, the first user may be provided with an indication of what is being shared to the second user.

Figure 10:
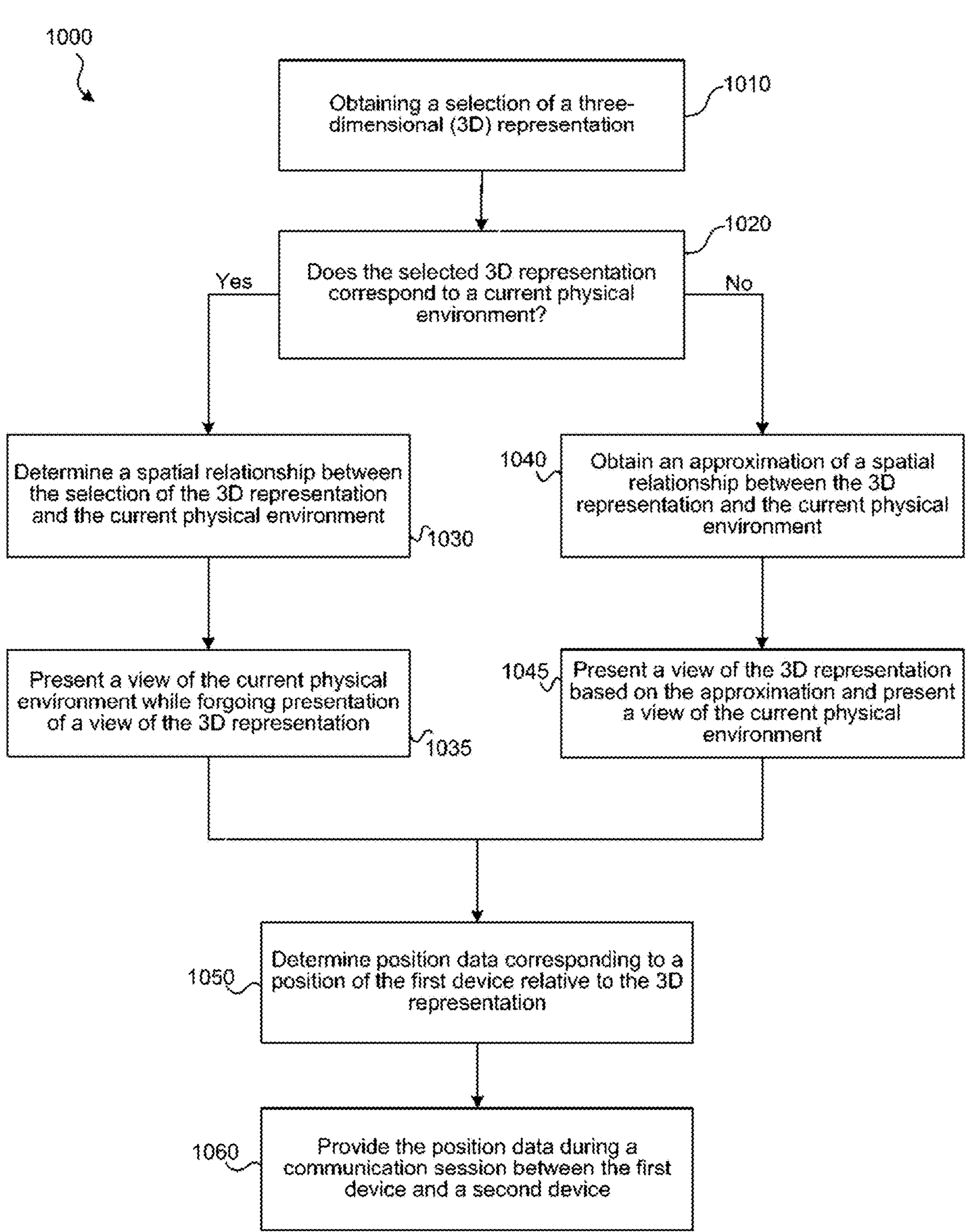
FIG. 10 is a flowchart illustrating a method for determining whether a 3D representation of an environment corresponds to a current physical environment of a first device and determining position data corresponding to a position of the first device relative to the 3D representation during a communication session in accordance with some implementations.

FIG. 10 is a flowchart illustrating a method 1000 for method for determining whether a 3D representation of an environment corresponds to a current physical environment of a first device and determining position data corresponding to a position of the first device relative to the 3D representation during a communication session. In some implementations, a device, such as electronic device 105 or electronic device 155, or a combination of the two, performs method 1000. In some implementations, method 1000 is performed on a mobile device, desktop, laptop, HMD, car-mounted device or server device. The method 1000 is performed by processing logic, including hardware, firmware, software, or a combination thereof. In some implementations, the method 1000 is performed on a processor executing code stored in a non-transitory computer-readable medium (e.g., a memory).

At block 1010, the method 1000 obtains a selection of a 3D representation of an environment. For example, a user may select a desired 3D representation (e.g., a 3D scan of a physical environment such as an office space) to present in a communication session. For example, the user may choose to host a communication session while physically located in their office using a scan of their office (e.g., the current physical environment 100 of FIG. 1). Alternatively, a user may want to host a communication session while physically located in their office using a virtual representation of a different environment (e.g., a different room, such as a different office space, and not the office area of the current physical environment 100 for the 3D scan). The 3D representation (e.g., a 3D scan) may be a point cloud generated during a previously performed scanning procedure. In some implementations, the 3D representation includes a point cloud representing at least a portion of the current physical environment. For example, device 105 scans the physical environment 100 of FIG. 1. In some implementations, obtaining a selection of a 3D representation of an environment may include receiving a selection of a 3D representation of an environment made by another user, such as another user in a multi-user communication session.

At block 1020, the method 1000 determines whether the selected 3D representation of an environment corresponds to the current physical environment of the first device. For example, based on location information and/or user input, the system can determine that the current room the user is located is or is not the same room as the selected 3D representation (e.g., the 3D scan). For example, location information, such as GPS coordinates, WiFi matching, etc., can be used to determine that the user is located in a different room than the selected 3D scan. Additionally, or alternatively, a user may have selectable options to select a 3D scan of his or her office (or other 3D scans available in a library), and be notified they are selecting a 3D scan that is not of the current environment.

In some implementations, when the 3D representation is generated, a feature map and/or anchor points may be identified to facilitate subsequent alignment. For example, device 105 scans the physical environment 100 of FIG. 1 and generates the feature map 200 of FIG. 2. Additionally, or alternatively, device 105 scans the physical environment 100 of FIG. 1 and generates anchor points as illustrated in the anchor point representation 300 of FIG. 3. For example, during a scanning procedure, device 105 may currently perform a visual simultaneous localization and mapping (SLAM) process while generating a 3D point cloud representation of a physical environment. The 3D point cloud may have a positional and/or rotational offset relative to the SLAM map generated during the scanning procedure. In these examples, block 1010 may include performing a SLAM process on the current physical environment and comparing the SLAM map generated during the scanning procedure with the SLAM map of the current physical environment. It may be determined that the 3D representation corresponds to the current physical environment when the two SLAM maps are within a threshold similarity of one another. It may be determined that the 3D representation does not correspond to the current physical environment when the two SLAM maps are not within the threshold similarity of one another.

In other implementations, the 3D representation may be associated with other types of location data, such as GPS, WiFi, beacons, cellular signals, or the like. In these examples, block 1010 may include comparing the location data associated with the 3D representation with corresponding location data obtained at the current physical environment.

At block 1030, in accordance with a determination that the 3D representation of an environment corresponds to the current physical environment, the method 1000 includes determining a spatial relationship between the selection of the 3D representation and the current physical environment, and at block 1035, the method 1000 presents presentation of a view of the current physical environment while forgoing a view of the 3D representation. For example, the method may auto-align the obtained 3D representation of the environment with the current physical environment, and present a view of the current physical environment, which may include presenting a pass-through video of the environment or allow the user to directly view the environment through a transparent or translucent display. In some implementations, presenting a view of the current physical environment at block 1035 includes forgoing display of the 3D representation. This may advantageously provide the user with a higher quality presentation of the physical environment in situations where the representation is of lower quality. In some implementations, while the portions of the 3D representation that correspond to the physical environment (e.g., walls, floors, physical objects, etc.) may not be displayed, virtual content (e.g., virtual content that does not correspond to a physical article in the physical environment), such as applications, images, media, or the like, may be displayed. This may provide the user with a view of the environment that matches that seen by other participants in the multi-user communication session. Determining a spatial relationship may involve aligning based on visual matching, such as based on comparing images and/or features identified based on images. Additionally, or alternatively, determining a spatial relationship may involve visual matching based on anchor points. In some implementations, the aligning may involve matching a feature map associated with the 3D representation with features identified in the current physical environment, WIFI-matching, detecting planes, a best fit analysis, using semantic data identifying floors and walls, high-level 2D matching, and the like.

In some implementations, determining the spatial relationship between the 3D representation and the current physical environment includes aligning features based on visual matching. For example, based on comparing images and/or features identified based on images, as illustrated by the feature map 200 of FIG. 2 and/or the feature map 410 of FIG. 4. In some implementations, the 3D representation includes a feature map (e.g., feature map 200 of FIG. 2) that includes features associated with the current physical environment, and the visual matching is based on matching the feature map associated with the 3D representation with features identified in the current physical environment. For example, as illustrated and discussed herein regarding the feature map 410 of FIG. 4, the feature map matching processes identify particular features in a current scan of the environment (e.g., the user sitting down at their desk in preparation for a communication session). In some implementations, the 3D representation includes anchor points (e.g., anchor point representation 300 of FIG. 3), where each anchor point is associated with a particular location within the current physical environment, and the visual matching is based on the anchor points. For example, as discussed herein with reference to the feature map 410 of FIG. 4, the anchor points of FIG. 3 may be used in addition to or alternatively to the feature map 410. An anchor point matching process may identify particular anchors in a current scan of the environment (e.g., the user sitting down at their desk in preparation for a communication session), and based on the identified anchors in the current scan, match those with the acquired 3D representation (e.g. based on location data, orientation, visual features, a corner, a portion of an object that is typically stationary, and the like).

In some implementations, determining the spatial relationship between the 3D representation and the current physical environment is based on visual simultaneous localization and mapping (SLAM). Alternatively, or additionally, in some implementations, determining the spatial relationship between the 3D representation and the current physical environment is based on matching a WiFi signature of the 3D representation and a WiFi signature of the first device in the current physical environment. WiFi matching geolocates an electronic device based on a distance from the device to known WiFi signals. For instance, if a scan is associated to nearby WiFi signals (and their relative strength when the capture was made), the system can later attempt to relocalize the device (e.g., a coarse relocalization) based on the current WiFi signature sensed by the system.

In some implementations, determining the spatial relationship between the 3D representation and the current physical environment is based on a best fit analysis between the 3D representation and sensor data of the first device in the current physical environment. In some implementations, determining the spatial relationship between the 3D representation and the current physical environment is based on matching semantic data associated with objects in the current physical environment between the 3D representation and sensor data of the first device in the current physical environment. For example, semantic data may be used to identify floors and walls, and using high-level 2D matching may be used to determine the spatial relationship between the 3D representation and the current physical environment.

In some implementations, as mentioned above, the 3D representation (e.g., 3D point cloud) may be aligned with a SLAM map generated during a scanning procedure. In these implementations, block 1020 may include aligning the SLAM map generated during the scanning procedure with a SLAM map of the current physical environment and determining the spatial relationship between the 3D representation and the current physical environment based on the known positional and/or rotational offset between the 3D representation and the SLAM map generated during the scanning procedure. Performing alignment in this way advantageously allows for alignment between a 3D representation (e.g., 3D point cloud) and a SLAM map, which may be difficult to do otherwise.

At block 1040, in accordance with a determination that the 3D representation of an environment does not correspond to the current physical environment, the method 1000 includes obtaining an approximation of a spatial relationship between the 3D representation and the current physical environment, and at block 1045, the method 1000 presents a view of the 3D representation based on the approximation and presents a view of the current physical environment. Thus, the 3D representation does not correspond to the user's current physical environment. For example, a user may want to host a communication session in their current room, such as a different office space, and not the office area of the obtained 3D scan (e.g., current physical environment 100). For example, the 3D scan is presented in a view to the user since the user is not physically located in the desired environment.

In some implementations, obtaining an approximation of the spatial relationship between the 3D representation and the current physical environment includes determining a best-fit alignment between the 3D representation and the current physical environment. For example, since the selected 3D representation does not correspond to the current environment, the system can try to automatically place the 3D representation in a way that it would fit in the user's physical environment.

Alternatively, in some implementations, obtaining an approximation of the spatial relationship between the 3D representation and the current physical environment is based on user input. For example, since the selected 3D representation does not correspond to the current environment, the system can notify the user to approximate a best guess fit of the 3D scan with the current environment (e.g., prompt the user to manually align (e.g., drag and drop) the 3D representation and the current environment).

In some implementation, the view of the 3D representation is presented as overlaid on the view of the current physical environment. For example, presenting a view of the current physical environment and/or the 3D representation based on the approximation of the spatial relationship between the 3D representation and the current physical environment may include presenting a pass-through video of the current physical environment or allow the user to directly view the current physical environment through a transparent or translucent display.

At block 1050, the method 1000 determines position data corresponding to a position of the first device relative to the 3D representation, based on a location of the first device in the current physical environment and the spatial relationship between the 3D representation and the current physical environment. In some implementations, the position data may include a location, an orientation, or a combination of the two (e.g., a pose).

At block 1060, the method 1000 provides the position data during a communication session between the first device and a second device. In some implementations, a view of the 3D representation including a representation of a user of the first device positioned based on the position data is presented to a user of the second device during the communication session. In some implementations, the representation of the first user may be based on live sensor data obtained during the communication session (e.g., a real-time avatar). Additionally, a privacy option may enable the first user to limit or otherwise select portions of the 3D representation to be shared. In some implementations, the first user may be provided with an indication of what is being shared to the second user.

The method 900 and method 1000 may optionally include one or more of the following implementations.

In some implementations, the view of the 3D representation or the view of the current physical environment is provided during a communication session between the first device and the second device in different physical environments. For example, as illustrated in FIG. 6, the electronic device 155 provides a view 605 that enables user 160 to view a representation 620 (e.g., an avatar) of the user 110 within a 3D environment 650.

In some implementations, the representation of at least the portion of the user of the first device and a representation of at least the portion of the user of the second device is generated based on sensor data obtained during the communication session. For example, as illustrated in FIG. 6, the electronic device 155 provides a view 605 that enables user 160 to view a representation 620 (e.g., an avatar) of at least a portion of the user 110 (e.g., from mid-torso up) within a 3D environment 650. Additionally, for example, as illustrated in FIGS. 7 and 8, the electronic device 105 provides a view 705, 805, respectively, that enables user 110 to view a representation 720, 820, respectively, of at least a portion himself or herself within the 3D environment 750, 850, respectively (e.g., showing a user what the other user 160 would see during the communication session).

In some implementations, the view of the 3D representation or the view of the current physical environment at the first device includes an indication of the view the 3D representation at the second device. For example, as illustrated in FIG. 7, the user 110 is provided with an indication (e.g., notification bubble 790) of what view of the XR environment is being shared to user 160 at device 155. Additionally, or alternatively, in some implementations, the indication may include visual markers or some type of visual feature to the user 110 of each portion of the view is being displayed to the other user (e.g., user 160 at device 155). For example, a greyed-out area may show the user 110 the content of the 3D environment 750 that is not being shown to the user 160 at device 155. For example, only the representation 720 of user 110 and the representation 770 of desk 130 is shown, and the remaining portion is blurred and/or greyed out such that the user 160 at device 155 can only see those portions that are not blurred and/or greyed out (e.g., representation 720 and representation 770).

In some implementations, the method 900 and 1000 updates at least a portion of the view at the second device based on user input at the first device. For example, as illustrated in FIG. 8, the user 110 can add virtual objects to the XR environment being shared to user 160 at device 155. Additionally, or alternatively, in some implementations, a privacy option may enable the user 110 to limit or otherwise select portions of the 3D representation to be shared. For example, as illustrated in FIG. 8, the user 110 removed the representation 775 of the painting (e.g., for privacy reasons, or just because the user wanted to make their office more appealing), and added virtual content 875 (e.g., a virtual clock). The virtual content 875 may replace objects in the 3D environment 850, which is shared with device 155, or additional virtual content may be added to other locations (e.g., adding a virtual object, such as a virtual desk ornament on top of the representation 870 of the desk 130.

In some implementations, a view of the communication session is presented in an XR experience. In some implementations, the first device and/or the second device is an HMD. For example, if each user in the communication session (e.g., user 110 and user 160) is wearing an HMD, then providing a view of the representation of each user (e.g., an avatar) while engaging in a video/XR conversation would be more suitable than displaying a view of the user because the HMD may be cumbersome and may cover the user's face. Thus, the processes described herein, provide an efficient way to obtain a previously acquired 3D representation of the room (e.g., a person's office), then obtain current location data of the user (e.g., the user is now sitting at the desk), in order to quickly align the previous 3D representation with the user's current location, to send to the second user to show them the 3D/XR environment of the first user. For example, if the first user is positioned sitting behind the desk in the first user's current physical environment, the second user will see an avatar of the first user positioned in the same relative position behind a representation of the desk in his view of the 3D representation. This is accomplished based on detecting that the first user is within an environment associated with a 3D representation and aligning the 3D representation with respect to the physical environment, e.g., so that the first user's current position within the environment can be used to identify a corresponding position of the user with respect to the 3D representation.

In some implementations, the method 900 and 1000 includes a determination to switch from a first presentation mode to a second presentation mode based on user input. For example, a user may select a selfie mode, a side conversation (e.g., direct messaging) mode, ask a question during a presentation, and the like. In some implementations, as inputs, a number of participants currently in a communication session may be relevant. For example, a communication session application could choose different layouts based on number of people (e.g., several people watching the first user 110 speak behind his or her desk 130). Additionally, or alternatively, the user input may include moving his or her device in a particular direction or motion.

In some implementations, the elements (e.g., the user representations as avatars or other objects) are shown as "blobs", faded, etc., during a privacy feature of the communication session. For example, visual attributes associated with the representations may be altered (e.g., blurred/blob) when switching between a first presentation mode and a privacy presentation mode, and vice versa. The visual attributes may be visible for a viewpoint of a third device. For example, when two users interact in a direct messaging session, a third user on a third device in the multi-user communication session, may see the avatars of the two users in the direct messaging session as blurred out or faded, which may indicate to the third user that those two users are not available to interact with at that time during multi-user communication session. Then, when the direct messaging session has ended, then the visual attributes of the two user's avatars may be restored such that the third user can then interact with them again if desired.

In some implementations, method 900 and 1000 may include utilizing different presentation modes that may include presenting a preview window (e.g., a preview mode) that includes a preview of the 3D/XR environment that may be shown to another user. The preview window would then allow a user to potentially modify particular elements of the 3D/XR environment. For example, the user 110, as illustrated in FIG. 8, removed a representation of the wall hanging 120 and replaced it with virtual content 875 (e.g., a virtual clock).

Figure 11:
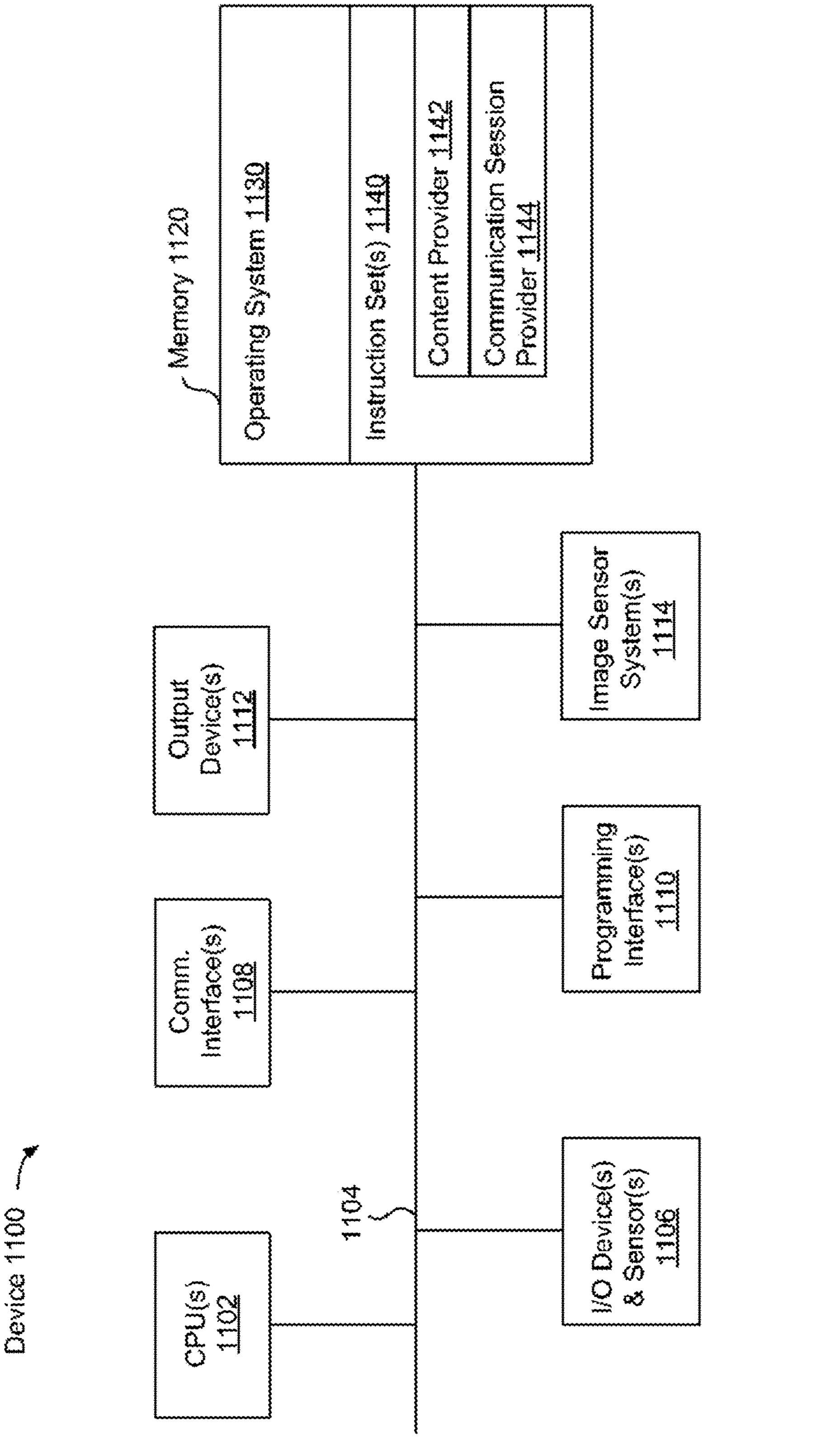
FIG. 11 is a block diagram of an electronic device in accordance with some implementations.

FIG. 11 is a block diagram of electronic device 1100. Device 1100 illustrates an exemplary device configuration for electronic device 105 or electronic device 155. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1110, one or more output device(s) 1112, one or more interior and/or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1112 include one or more displays configured to present a view of a 3D environment to the user. In some implementations, the one or more output device(s) 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1100 includes a single display. In another example, the device 1100 includes a display for each eye of the user. In some implementations, the one or more output device(s) 1112 include one or more audio producing devices. In some implementations, the one or more output device(s) 1112 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1112 may additionally or alternatively be configured to generate haptics.

In some implementations, the one or more image sensor systems 1114 are configured to obtain image data that corresponds to at least a portion of a physical environment. For example, the one or more image sensor systems 1114 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1114 further include illumination sources that emit light, such as a flash. In various implementations, the one or more image sensor systems 1114 further include an on-camera image signal processor (ISP) configured to execute a plurality of processing operations on the image data.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 includes a non-transitory computer readable storage medium.

In some implementations, the memory 1120 or the non-transitory computer readable storage medium of the memory 1120 stores an optional operating system 1130 and one or more instruction set(s) 1140. The operating system 1130 includes procedures for handling various basic system services and for performing hardware dependent tasks. In some implementations, the instruction set(s) 1140 include executable software defined by binary information stored in the form of electrical charge. In some implementations, the instruction set(s) 1140 are software that is executable by the one or more processing units 1102 to carry out one or more of the techniques described herein.

The instruction set(s) 1140 include a content provider instruction set 1142 configured to, upon execution, provide a view of a 3D environment, for example, during a communication session, as described herein. The instruction set(s) 1140 further include a communication session provider instruction set 1144 configured to, upon execution, determine to provide a communication session within a view of a 3D environment as described herein. The instruction set(s) 1140 may be embodied as a single software executable or multiple software executables.

Although the instruction set(s) 1140 are shown as residing on a single device, it should be understood that in other implementations, any combination of the elements may be located in separate computing devices. Moreover, FIG. 11 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

The described technology may gather and use information from various sources. This information may, in some instances, include personal information that identifies or may be used to locate or contact a specific individual. This personal information may include demographic data, location data, telephone numbers, email addresses, date of birth, social media account names, work or home addresses, data or records associated with a user's health or fitness level, or other personal or identifying information.

The collection, storage, transfer, disclosure, analysis, or other use of personal information should comply with well-established privacy policies or practices. Privacy policies and practices that are generally recognized as meeting or exceeding industry or governmental requirements should be implemented and used. Personal information should be collected for legitimate and reasonable uses and not shared or sold outside of those uses. The collection or sharing of information should occur after receipt of the user's informed consent.

It is contemplated that, in some instances, users may selectively prevent the use of, or access to, personal information. Hardware or software features may be provided to prevent or block access to personal information. Personal information should be handled to reduce the risk of unintentional or unauthorized access or use. Risk can be reduced by limiting the collection of data and deleting the data once it is no longer needed. When applicable, data de-identification may be used to protect a user's privacy.

Although the described technology may broadly include the use of personal information, it may be implemented without accessing such personal information. In other words, the present technology may not be rendered inoperable due to the lack of some or all of such personal information.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for case of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a first device comprising one or more processors:

obtaining a selection of a three-dimensional (3D) representation of an environment, wherein the 3D representation comprises a feature map that includes features associated with a physical environment;

determining whether the selected 3D representation of the environment corresponds to a current physical environment of the first device; and in accordance with a determination that the 3D representation of an environment corresponds to the current physical environment:

determining a spatial relationship between the 3D representation and the current physical environment by aligning features based on visual matching, wherein the visual matching comprises matching the feature map associated with the 3D representation with features identified in the current physical environment;

presenting a view of the current physical environment while forgoing presentation of a view of the 3D representation of the environment;

determining position data corresponding to a position of the first device relative to the 3D representation based on a location of the first device in the current physical environment and the spatial relationship between the 3D representation and the current physical environment; and providing the position data during a communication session between the first device and a second device, wherein a view of the 3D representation including a representation of a user of the first device positioned based on the position data is presented to a user of the second device during the communication session.

2. The method of claim 1, wherein the 3D representation comprises a point cloud representing at least a portion of a physical environment.

3. The method of claim 1, wherein the 3D representation comprises anchor points, each anchor point associated with a particular location within a physical environment, and the visual matching is based on the anchor points.

4. The method of claim 1, wherein determining the spatial relationship between the 3D representation and the current physical environment is based on visual simultaneous localization and mapping (SLAM).

5. The method of claim 1, wherein determining the spatial relationship between the 3D representation and the current physical environment is based on matching a WiFi signature of the 3D representation and a WiFi signature of the first device in the current physical environment.

6. The method of claim 1, wherein determining the spatial relationship between the 3D representation and the current physical environment is based on a best fit analysis between the 3D representation and sensor data of the first device in the current physical environment.

7. The method of claim 1, wherein determining the spatial relationship between the 3D representation and the current physical environment is based on matching semantic data associated with objects in a physical environment represented by the 3D representation and objects in the current physical environment.

8. The method of claim 1, wherein the first device and the second device are in different physical environments.

9. The method of claim 1, wherein the representation of at least a portion of the user of the first device is generated based on sensor data obtained during the communication session.

10. The method of claim 1, further comprising:

updating at least a portion of the view at the second device based on user input at the first device.

11. The method of claim 1, wherein the view of the 3D representation at the first device comprises an indication of the view the 3D representation at the second device.

12. The method of claim 1, wherein a view of the communication session is presented in an extended reality (XR) experience.

13. The method of claim 1, wherein the first device or the second device is a head-mounted device (HMD).

14. The method of claim 1, wherein the visual matching is based on matching semantic data identifying objects, floors, and walls.

15. The method of claim 1, wherein the feature map generated for the current physical environment includes location/position information for identified objects and identifies a location of the user.

16. The method of claim 1, wherein the feature map and visual matching facilitate aligning the 3D representation with respect to the current physical environment so that the user's current position within the physical environment can be used to identify a corresponding position of the user with respect to the 3D representation.

17. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining a selection of a three-dimensional (3D) representation of an environment, wherein the 3D representation comprises a feature map that includes features associated with a physical environment;

determining whether the selected 3D representation of the environment corresponds to a current physical environment of a first device; and in accordance with a determination that the 3D representation of an environment corresponds to the current physical environment:

determining a spatial relationship between the 3D representation and the current physical environment by aligning features based on visual matching, wherein the visual matching comprises matching the feature map associated with the 3D representation with features identified in the current physical environment;

presenting a view of the current physical environment while forgoing presentation of a view of the 3D representation of the environment;

determining position data corresponding to a position of the first device relative to the 3D representation based on a location of the first device in the current physical environment and the spatial relationship between the 3D representation and the current physical environment; and providing the position data during a communication session between the first device and a second device, wherein a view of the 3D representation including a representation of a user of the first device positioned based on the position data is presented to a user of the second device during the communication session.

18. The system of claim 17, wherein the 3D representation comprises anchor points, each anchor point associated with a particular location within the current physical environment, and the visual matching is based on the anchor points.

19. A non-transitory computer-readable storage medium storing program instructions executable via one or more processors to perform operations comprising:

obtaining a selection of a three-dimensional (3D) representation of an environment, wherein the 3D representation comprises a feature map that includes features associated with a physical environment;

determining whether the selected 3D representation of the environment corresponds to a current physical environment of a first device; and in accordance with a determination that the 3D representation of an environment corresponds to the current physical environment:

determining a spatial relationship between the 3D representation and the current physical environment by aligning features based on visual matching, wherein the visual matching comprises matching the feature map associated with the 3D representation with features identified in the current physical environment;

presenting a view of the current physical environment while forgoing presentation of a view of the 3D representation of the environment;

determining position data corresponding to a position of the first device relative to the 3D representation based on a location of the first device in the current physical environment and the spatial relationship between the 3D representation and the current physical environment; and providing the position data during a communication session between the first device and a second device, wherein a view of the 3D representation including a representation of a user of the first device positioned based on the position data is presented to a user of the second device during the communication session.

* * * * *